US012787967B2

(12) United States Patent
Doré et al.

(10) Patent No.: US 12,787,967 B2
(45) Date of Patent: Nov. 10, 2026

(54) APPARATUS AND METHOD FOR FUSING CURD

(71) Applicants: Michel Doré, Embrun (CA); Antoine Michel, L'Ancienne-Lorette (CA); André Giguère, Ste-Famille (CA)

(72) Inventors: Michel Doré, Embrun (CA); Antoine Michel, L'Ancienne-Lorette (CA); André Giguère, Ste-Famille (CA)

( * ) Notice: Subject to any disclaimer, the term of this patent is extended or adjusted under 35 U.S.C. 154(b) by 555 days.

(21) Appl. No.: 18/133,786

(22) Filed: Apr. 12, 2023

(65) Prior Publication Data

US 2023/0320313 A1 Oct. 12, 2023

Related U.S. Application Data

(60) Provisional application No. 63/330,145, filed on Apr. 12, 2022.

(51) Int. Cl.

*A01J 25/12* (2006.01)
*A01J 25/11* (2006.01)
*A23C 19/072* (2006.01)
*B65G 15/16* (2006.01)
*G05D 16/00* (2006.01)

(52) U.S. Cl.

CPC ............ *A01J 25/12* (2013.01); *A01J 25/115* (2013.01); *A23C 19/072* (2013.01); *B65G 15/16* (2013.01); *G05D 16/028* (2019.01)

(58) Field of Classification Search

CPC ....... A01J 25/12; A01J 25/115; G05D 16/028; A23C 19/072; B65G 15/16
USPC .......................................................... 426/479
See application file for complete search history.

(56) References Cited

U.S. PATENT DOCUMENTS 3,716,376 A 2/1973 Clark
3,891,783 A 6/1975 Robertson et al.
4,061,794 A 12/1977 Charles
4,237,781 A 12/1980 Charles
4,898,745 A 2/1990 Zamzow et al.
4,989,504 A 2/1991 Jay
5,175,014 A * 12/1992 Brockwell .............. B65B 5/108 426/582

(Continued)

FOREIGN PATENT DOCUMENTS

CN 105211294 3/2019
DE 1846838 2/1962
DE 1912499 A1 9/1970

(Continued)

*Primary Examiner* — Brent T O'Hern

(57) ABSTRACT

An apparatus for fusing curd provided and comprises a container to receive curd to form a curd stack, which has associated thereto a pressure parameter specifying a pressure required at the bottom of the curd stack to produce a curd block from a bottom portion of the curd stack. The apparatus also comprises a gas pressure system to apply a gas overpressure in the container when a pressure value at the bottom of the curd stack is below the pressure parameter. The gas overpressure has a value equal to or greater than a difference between the pressure required at the bottom of the curd stack and the pressure value at the bottom of the curd stack. A method for fusing curd is also provided and includes applying an overpressure to a curd stack to compensate for insufficient pressure at the bottom of the curd stack.

16 Claims, 10 Drawing Sheets

(56) References Cited

U.S. PATENT DOCUMENTS

| | | | |
|---|---|---|---|
| 6,119,589 | A | 9/2000 | Hain et al. |
| 2016/0143307 | A1 | 5/2016 | Luyten et al. |

FOREIGN PATENT DOCUMENTS

| | | | |
|---|---|---|---|
| EP | 1275296 | | 2/2006 |
| FR | 2086741 | A5 | 12/1971 |
| GB | 859195 | | 1/1961 |
| WO | 2012091562 | A1 | 7/2012 |

* cited by examiner

FIG. 2
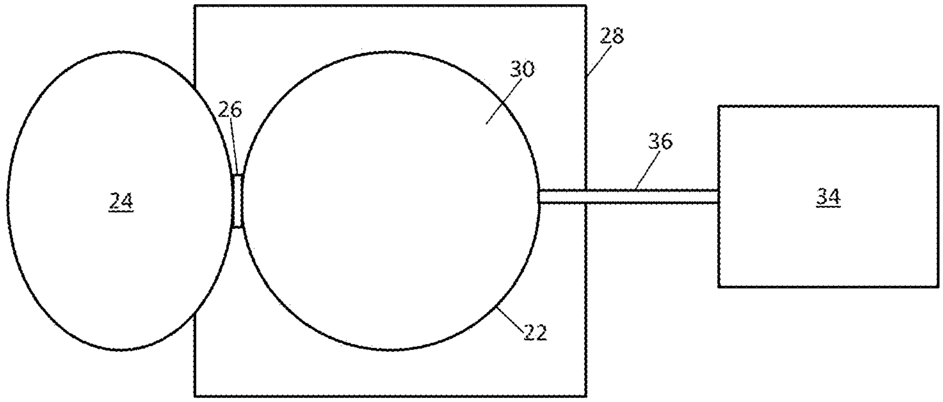
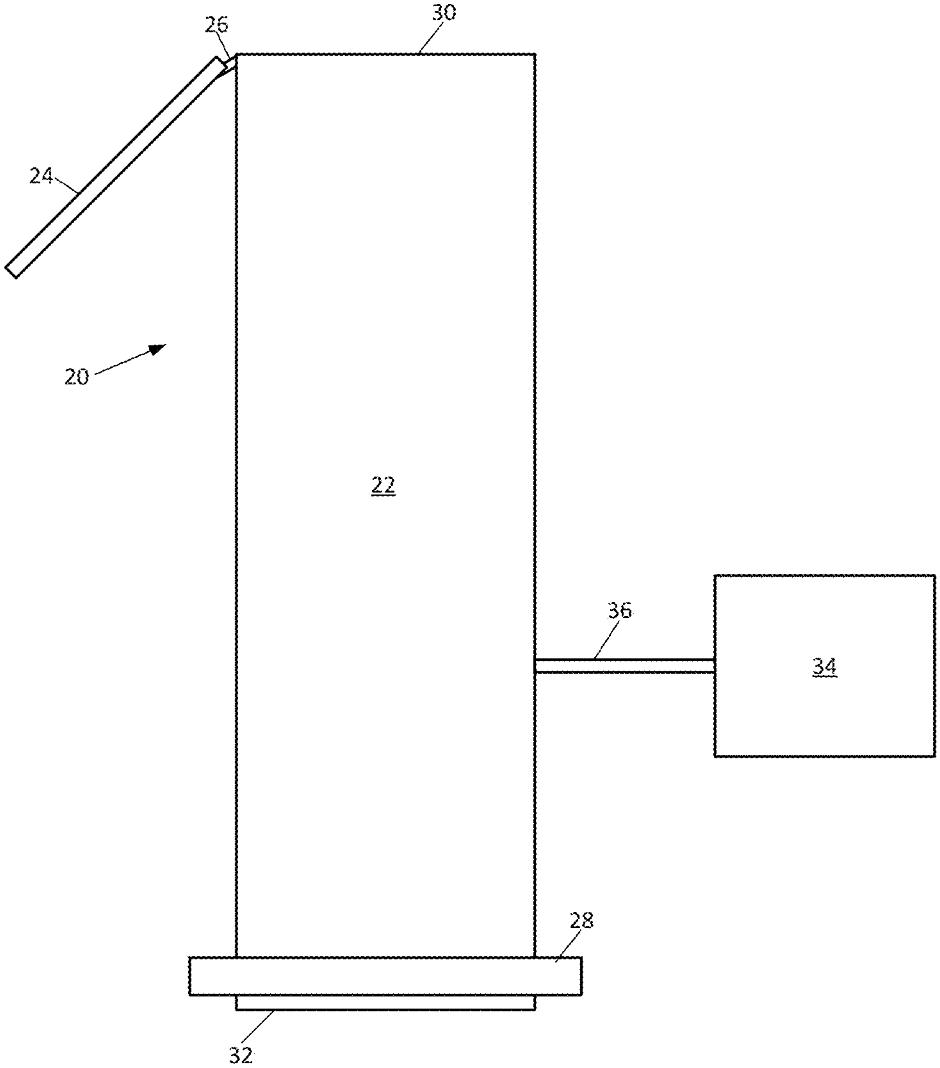
FIG. 1

APPARATUS AND METHOD FOR FUSING CURD

FIELD OF THE INVENTION

The present disclosure relates to the field of cheese making. In particular, the present disclosure relates to apparatuses and methods of fusing curd.

BACKGROUND

This section is intended to introduce various aspects of the art, which may be associated with the present disclosure. This discussion is believed to assist in providing a framework to facilitate a better understanding of aspects of the present disclosure. Accordingly, this section should be read in this light, and not necessarily as admissions of prior art.

Cheese curds can constitute a final product for the purpose of eating as a snack or as an ingredient in preparing dishes such as poutine or can be considered as an intermediary product to be used in a subsequent cheese making processes. The manufacturing of cheese curds requires that curd be fused, which involves intense manual labor and long time periods.

For example, when making cheddar cheese, curd may be fused by being manually formed into a thick layer that is cut into slabs of fused curd and the slabs are stacked atop each other to form fused curd stacks. The cutting and manipulation of the curd and the stacking of fused curd slabs promotes the syneresis process necessary to produce cheese. The stacking of the slabs of fused curd results in pressure being applied to the slabs, which causes whey to be expelled from the slabs. After ten minutes or so, the slabs are turned over and are again stacked atop each other and, in some instances, individual stacks are stacked atop one another. This can be repeated several times until the acidity of the fused curd stacks reaches a target pH value (e.g., a value comprised between 5.1 and 6.0) and proteins become aligned in the stack. When the target pH is reached, the fused curd stacks are milled into pieces of fused curd (cheese curds), which can then be either salted and packaged for consumer distribution or used in a subsequent cheese making process. For example, when the cheese curds are used in making cheddar cheese or other types of salted or unsalted cheeses, the cheese curds are provided to a pressing device where they are pressed against each other to form a continuum and are subsequently cut into blocks of cheese, packaged and aged.

The fused curd stacks prepared using the manual curd fusing process outlined above may still contain air pockets, water pockets and interstices such that when blocks of a fused curd stack is subjected to the milling process, the resulting cheese curds are unevenly sized and include multiple fines, which give the cheese curds a poor appearance. Further, because the cheese curds are unevenly sized, it can become challenging to automatically package the cheese curds into packages that have a precise target weight.

Therefore, improvements in the manufacturing of cheese curds are desirable.

SUMMARY

In accordance with embodiments of the present invention, there is provided an apparatus for fusing curd. The apparatus comprises a container configured to receive curd therein to form a curd stack in the container, and a gas pressure system coupled to the container and configured to apply an overpressure on the curd stack when the container is sealed. There is also provided a method of producing cheese curds in batch. The method comprises obtaining curd in a container; stacking the curd to obtain a curd stack; sealing the container; subjecting the curd stack to an overpressure; maintaining the curd stack at the overpressure for a target duration; releasing the overpressure; and transforming a portion of the curd stack into cheese curds.

In accordance with another aspect, there is provided an apparatus for fusing curd. The apparatus comprises a container configured to receive curd to form a curd stack in the container. The curd stack has associated thereto a pressure parameter specifying a pressure required at the bottom of the curd stack to produce a curd block from a bottom portion of the curd stack. The apparatus also comprises a gas pressure system configured to apply a gas overpressure in the container. The gas pressure system being configured to apply the gas overpressure when a pressure value at the bottom of the curd stack is below the pressure parameter. The gas overpressure has a gas overpressure value equal to or greater than a difference between the pressure required at the bottom of the curd stack and the pressure value at the bottom of the curd stack.

The gas pressure system may comprise a cover configured to seal the container; and a gas source coupled to the container and configured to provide gas in the container to apply the overpressure.

The apparatus may further comprise a controller configured to obtain an indication that the pressure applied by the curd stack at the bottom of the curd stack is below the pressure parameter. The controller may be further configured to obtain the value of the gas overpressure to apply in the container. The apparatus may comprise a pressure sensor configured to measure the pressure at the bottom of the curd stack.

The apparatus may comprise a gas pressure sensing device configured to measure a gas pressure inside the container and to provide a signal to the controller to indicate that the pressure applied by the curd stack at the bottom of the curd stack is below the pressure parameter.

The controller may be configured to determine the pressure at the bottom of the curd stack in accordance with a height of the curd stack and with a predetermined pressure per unit length parameter of the curd stack.

The apparatus may comprise a conveyor unit that includes a conveyor mechanism that has a receiving portion and an emptying portion. The conveyor mechanism may be configured to convey a whey and curd mixture from the receiving portion toward the emptying portion. The emptying portion may be configured to provide the whey and curd mixture to the container. The conveyor unit may comprise an input unit configured to receive the whey and curd mixture and to provide the whey and curd mixture to the receiving portion of the conveyor mechanism. The conveyor unit may comprise a cover portion covering the conveyor mechanism and the cover portion may be configured to impede a loss of thermal energy from the whey and curd mixture to an outside of the conveyor unit to limit a drop in a temperature of the whey and curd mixture as the whey and curd mixture is conveyed from the receiving portion to the emptying portion.

The container may have an output portion configured to cut a block of curd from the curd stack. The apparatus may comprise a stretching device configured to receive the block of curd and to reduce a thickness and increase a length of the block of curd. The stretching device may comprise vertically spaced apart conveyors between which the block of curd is to be provided, and a curd cutter configured to receive the block of curd from the stretching device and to cut the block of curd into cheese curds.

The apparatus may comprise temperature control system configured to maintain a temperature of the container within a predetermined temperature range. The temperature control system may be configured to maintain the temperature within the predetermined temperature range with an accuracy of ±0.5° C.

The apparatus may comprise a pump system configured to pump the whey and curd mixture from a cheese cooking vat to the conveyor unit. The pump system may comprise a positive displacement pump.

The conveyor mechanism may be configured to drain whey from the whey and curd mixture as the whey and curd mixture is conveyed from the receiving portion to the emptying portion. The conveyor mechanism may include a perforated conveyor belt defining a plurality of draining apertures configured to allow whey from the whey and curd mixture to drip therefrom.

The conveyor mechanism may include a gutter configured to receive whey dripping through the plurality of apertures and to output the whey to a whey recovery container. The conveyor mechanism may be at an oblique angle.

In accordance with a further aspect, there is provided a method of producing cheese curds. The method comprises obtaining curd in a container, stacking the curd to obtain a curd stack, maintaining the curd stack within a predetermined temperature range for a predetermined time period, sealing the container from atmospheric pressure, providing a gas overpressure to an inside of the container to subject the curd stack to the gas overpressure, maintaining the curd stack at the overpressure for a target duration, releasing the overpressure, and transforming a portion of the curd stack into cheese curds.

The subjecting the curd to the overpressure may be to compensate for a pressure at the bottom of the curd stack being lower than a pressure required at the bottom of the curd stack. A value of the overpressure may be equal to or greater than a difference between the pressure required at the bottom of the curd stack and the pressure at the bottom of the curd stack. The method may further include obtaining a value of the pressure at the bottom of the curd stack.

Maintaining the curd stack at the overpressure for a target duration may include maintaining the curd stack at the overpressure for a duration comprised between about 1.5 hour and about 2.5 hours.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE SEVERAL VIEWS OF THE DRAWING(S)

Further features and advantages of the present invention will become apparent from the following detailed description, taken in combination with the appended drawings, in which:

FIG. 1 shows a side view of an embodiment of an apparatus for fusing curd in accordance with the present disclosure.

FIG. 2 shows a top view of the embodiment of FIG. 1.

It will be noted that throughout the appended drawings, like features are identified by like reference numerals.

DETAILED DESCRIPTION

Figure 3:
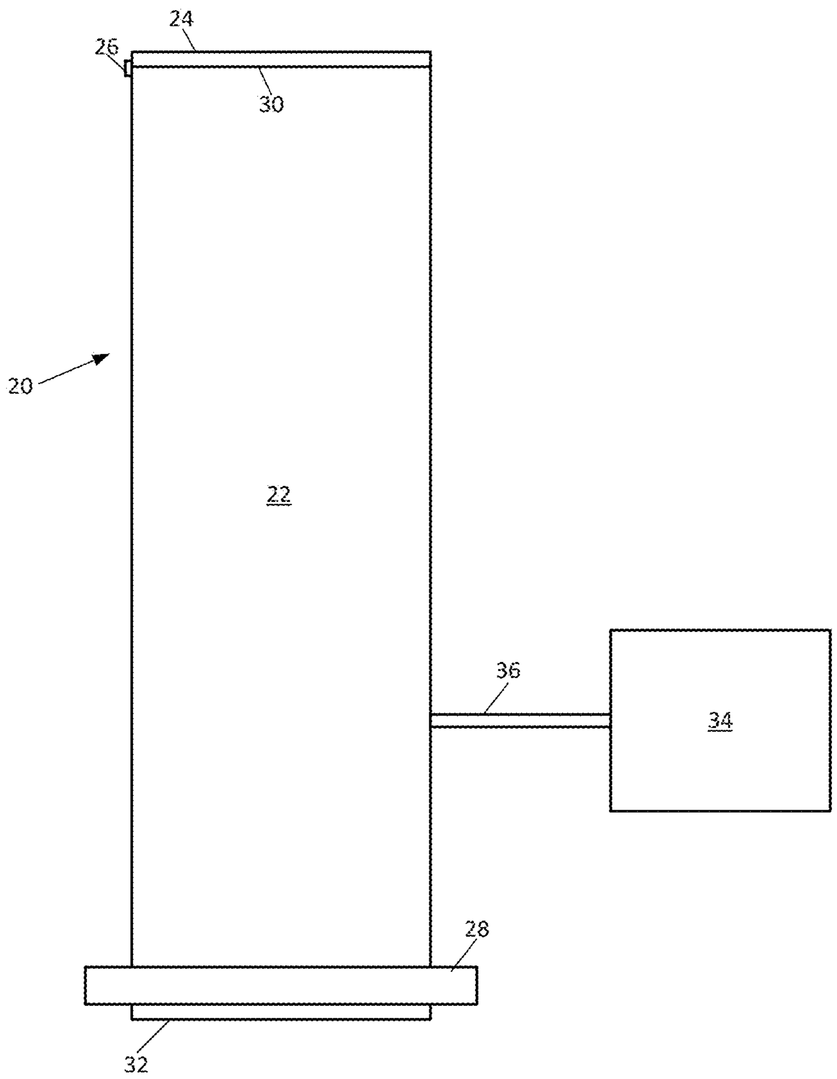
FIG. 3 shows a side view of the apparatus of FIGS. 1 and 2, with the cover in a closed position.

As used herein, the term "about" should be read as including variation from the nominal value, for example, a +/−10% variation from the nominal value. It is to be understood that such a variation is always included in a given value provided herein, whether or not it is specifically referred to.

FIG. 1 shows a side view of an embodiment of an apparatus 20 for fusing curd in accordance with the present disclosure. The apparatus 20 may comprise a container 22 and a cover 24 that may be pivotally connected to the container 22 through a hinge 26. FIG. 1 shows the cover 24 in an open position.

The container 22 defines a top opening 30 and a bottom opening 32. The apparatus 20 may comprise a controllable closure device 28 configured to open and close the bottom opening of the container 22. As will described in more detail below, curd is placed in the container 22 through the top opening 28 and forms a curd stack in the container 22, when the controllable closure device 28 is closed.

The apparatus 20 also comprises a gas pressure system 34 coupled to the container 22 through a conduit 26 and configured to apply an overpressure on the curd stack formed in the container 22 when the top opening 30 is closed by the cover 24 and when the bottom opening 32 is closed by the controllable closure device 28. The gas pressure system 34 is configured to supply any suitable gas to the inside of the container at an overpressure. The overpressure may range from a few pounds per square inch (psi) above atmospheric pressure up to 8.8 psi or more above atmospheric pressure. Non-limiting examples of gases that can be provided to the inside of the container include food grade carbon dioxide, air and nitrogen. The overpressure produced by the gas pressure system 34 subjects the curd stack to the overpressure.

When there is an overpressure in the container 22, it is important for the cover 24 to be secured to the container 22 during operation such as to seal the top opening 30. Any suitable mechanisms for securing the cover 24 to the container 22 to seal the top opening 30 are considered within the scope of the present disclosure. Examples of such mechanisms include latching mechanisms that latch the cover 24 to the container 22. Other mechanisms include interference closures (presto cooker type of closure), sliding closures, etc. In some embodiments, a seal (not shown) may be installed on the cover 24 or the top of the container 22 such that the seal is between the cover 24 and the top of the container 22 when the cover 24 is closed.

The formation of the curd stack in the container 22 compresses the cheese curd in the curd stack, which causes the curd stack to express whey as the acidification of the curd takes place and as the syneresis process takes place. The overpressure in the container 22 subjects the curd stack to an additional pressure, which assists the syneresis process.

The controllable closure device 28 can be any device that allows the curd stack or part thereof to exit the container 22. As an example, the controllable closure device 28 can include a butterfly valve or more than one butterfly valve, a guillotine valve or two guillotine valves, or any other known controllable closure device or cutter device.

FIG. 2 shows a top view of the apparatus 20 shown in FIG. 1.

FIG. 3 shows the apparatus 20 of FIG. 1, but with the cover 24 in a closed position, closing the top opening 30.

FIG. 3 shows a top view of the apparatus 20 shown in FIG. 1.

The container 22 shown in FIGS. 1-3 has a circular cross-section. However, embodiments where the container has a cross-section other than circular are considered within the scope of the present disclosure. For example, containers having a square cross-section, or a rectangular cross-section are within the scope of the present disclosure.

The cover 24 shown in FIGS. 1-3 is coupled to the container 22 through the hinge 26. However, embodiments where the cover is not coupled at all to the container are also within the scope of the present disclosure, as are embodiments where the cover is coupled to the container through means other than a hinge.

Figure 4:
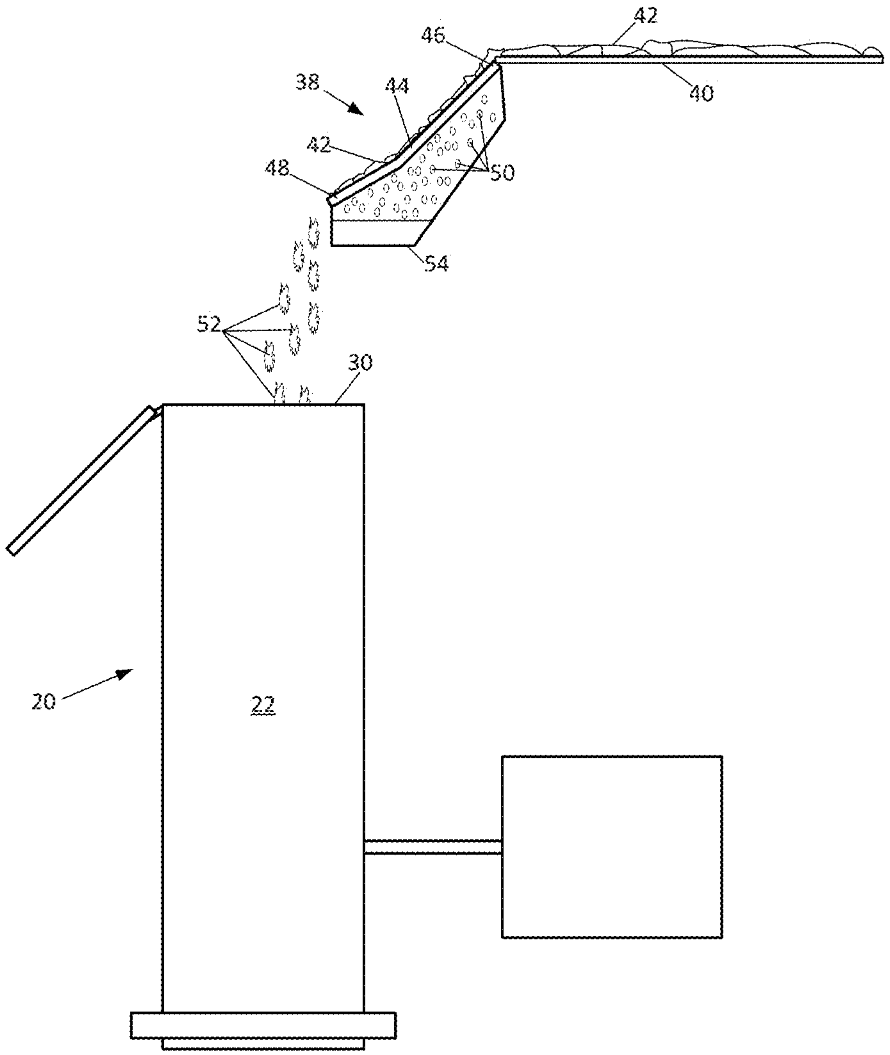
FIG. 4 shows a side view of another embodiment of an apparatus for fusing curd in accordance with the present disclosure.

FIG. 4 shows another embodiment of the present disclosure that includes the apparatus 20 shown in FIGS. 1-3 and a gravitational draining filter 38 to convey a whey and curd mixture toward the top opening 30 of the container 22 and to drain some of the whey out of the whey and curd mixture prior to the curd falling into the container 22. A conveyor 40 (e.g., a conveyor belt) conveys whey and curd mixture 42 toward the draining filter 38. The gravitational draining filter 38 includes an angled filter surface 44 that has a top end 46 at which the whey and curd mixture 42 is received from the conveyor 40. The angled filter surface 44 has a bottom end 48. The whey and curd mixture 42 slides down the angled filter surface 44 from the top end 46 toward the bottom end 48. The angled surface 44 defines a plurality of apertures (not shown). The apertures can be of any suitable size provided the size of the apertures allows whey to pass through the apertures while preventing most or the curd to pass through. For example, the apertures can have dimensions like those of draining cloth apertures or to those of whey/curd strainer apertures. In some embodiments, the dimension of the apertures can range from 3 to 20 microns. As the whey and curd mixture 42 slides from the top end 46 toward the bottom end 48, whey drains out of the curd 42 through the apertures defined by the angled filter surface 44. FIG. 4 shows drops 50 of whey. The curd 52, which has been drained of some of its whey, falls from the bottom end 48 of the angled surface 44 into the container 22, through the top opening 30. The whey drained from the whey and curd mixture 42 is collected in a collecting device 54.

Figure 5:
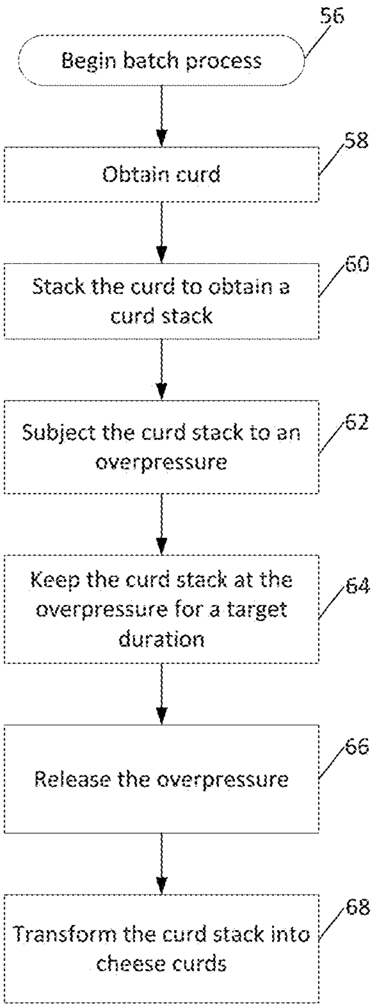
FIG. 5 shows a flowchart of an embodiment of a method to produce cheese curds in accordance with the present disclosure.

FIG. 5 shows a flowchart of an embodiment of a method in accordance with the present disclosure. The method shown in the flowchart of FIG. 5 is to produce, in a batch process, cheese curds. The batch process begins at step 56 and starts with obtaining curd at step 58 and is followed by stacking the curd to form a stack or column of curd as step 60. At step 62, the curd is subjected to a gas overpressure ranging from a few psi above atmospheric pressure to 8.8 psi or more above atmospheric pressure. At step 64, the curd is kept at the overpressure for a period of time ranging from 1.5 to 2.5 hours. The overpressure is released at step 66 and, at step 68, the curd stack, or a portion thereof, is transformed into cheese curds.

Referring now to FIGS. 1-5, action 58 can be such that the curd is obtained in a container, such as the container 22, using a curd delivery apparatus that includes, for example, the gravitational draining filter 38. The curd stack is stacked (step 60) in the container 22 to obtain a curd stack. The top opening 30 of the container 22 is closed to seal the container and an overpressure in the container 22 can be applied by the gas pressure system 34, through the conduit 36. Applying the overpressure in the container 22 subjects the curd stack to the overpressure. The overpressure is maintained in the container (step 64) for a target duration. The overpressure in the container 22 is subsequently released through any suitable pressure relief device (e.g., a valve). Subsequently, a portion of the curd stack (e.g., a block) is obtained from the container 22, for example by using a guillotine blade, and transformed into cheese curds (step 68) through any suitable transformation process (e.g., a milling process).

As will be understood by the skilled worker, the apparatus 20 can include a temperature control system to subject the container 22 to any suitable temperature cycle or to maintain the container within a target temperature range. The apparatus 20 may also include any suitable type of pH measuring device to measure the pH of the curd stack. The apparatus 20 may also include any suitable type of whey draining mechanism to remove the whey expressed from the curd stack.

Figure 6:
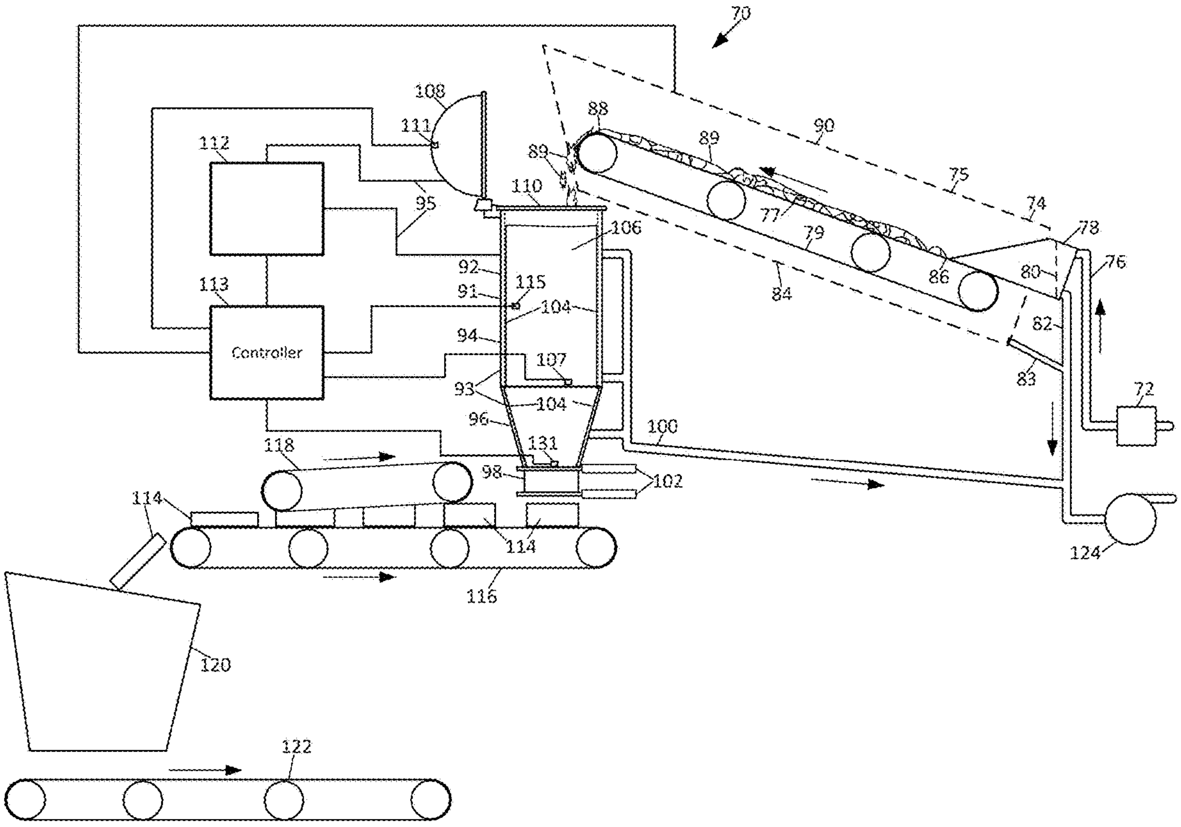
FIG. 6 shows another embodiment of an apparatus according to the present disclosure.

FIG. 6 shows an embodiment of an apparatus 70 for producing cheese curds in accordance with the present disclosure. For examples, the cheese curds that may be produced by the apparatus 70 include, for example, cheddar-type cheese curds and semi-hard cheese curds. The apparatus 70 may comprise a pump 72, e.g., a positive displacement pump, to pump cheese curd from a container (not shown) containing the cheese curd (e.g., a cheese vat used to cook the curd), to a conveyor unit 74. In some embodiments, a conduit 76 may be used to couple the pump 72 to the conveyor unit 74. As the cheese curd will generally be mixed with whey, it may be referred to as a whey and curd mixture. The pump 72 does not necessarily need to be a positive displacement pump; however, it may be preferable for the pump 72 to be of a type that maintains, as much as possible, the integrity of curd pumped from a cheese vat to the conveyor unit 74. In some embodiments, the conveyor unit 74 or components thereof may be at an oblique angle.

The conveyor unit 74 comprises a housing 75, a conveyor mechanism 77, and an input device 78 connected to the conduit 76 to receive a whey and curd mixture therefrom. The input device 78 may include a filter 80 configured to prevent curd clumps (clusters) having a size larger than a maximum allowable clump size from passing through and to allow whey and curd mixture or curd clumps having a size less than the maximum allowable clump size to pass. The curd clumps prevented from passing through the filter 80 may fall or slide toward a recovery conduit 82 connected to the input device 78 (to the conveyor unit 74). A portion of the whey present in the whey and curd mixture received at the input device 78 from the conduit 76 may flow toward, and be recovered by, the recovery conduit 82. In some embodiments, there may be no filter (80) present in the input device.

In some embodiments, such as in the embodiment shown at FIG. 6, there may be no draining of whey from the whey and curd mixture prior to the whey and curd mixture arriving at the input device 78 of the conveyor unit 74. This may allow for a more precise control of the humidity of the whey and curd mixture prior to the whey and curd mixture being placed in a container 92. That is, the amount of whey present in the whey and curd mixture (the humidity level of the curd) when the whey and curd mixture being placed into the container 92 may be controlled more accurately than if there were less whey in the whey and curd mixture. As an example, if the humidity of (the amount of whey present in) the whey and curd mixture arriving at the input device 78 is greater than a desired value needed for a particular cheese type, then the speed of the conveyor 77 may be adjusted (e.g., slowed) to allow more whey to drain from the whey and curd mixture before arriving into the container 92, and to meet the desired humidity level. In other embodiments, there may be some draining of whey from the whey and curd mixture prior to the whey and curd mixture arriving at the input device 78.

The curd that traverses the filter 80 may reach the conveyor mechanism 77 at a receiving portion 86 of the conveyor mechanism. The curd that reaches the conveyor mechanism 77 will generally still include whey and may continue to be referred to as whey and curd mixture. The conveyor mechanism may include a conveyor belt 79 that may define a plurality of apertures (not shown). The apertures can be of any suitable size provided the size of the apertures allows whey to pass through the apertures while preventing most or the curd from passing through the apertures. For example, the apertures may have dimensions like those of draining cloth apertures or to those of whey/curd strainer apertures. In some embodiments, the dimensions of the apertures can range from 3 to 20 microns. As the whey and curd mixture 89 is conveyed away from the input device 78, whey may drain out of the whey and curd mixture 89 through the plurality of apertures and fall onto a whey collecting surface 84, which may be a bottom surface of the housing 75. The whey collecting surface 84 may be angled toward a conduit 83 connected to the recovery conduit 82. In some embodiments, there may be no apertures (draining apertures) defined by the conveyor belt 79.

The housing 75 may be configured to cover the conveyor mechanism 77. The housing 75 may act as a thermal barrier between the whey and curd mixture present in the conveyor mechanism 74 and the atmosphere surrounding the housing 75, as the whey and curd mixture 89 is conveyed away from the input device 75 toward an output portion 88 of the conveyor mechanism 77. The presence of a cover portion 90 of the housing 75 helps maintain the temperature of the whey and curd mixture within a target temperature range, which allows greater control over the acidity or acidity variation of the whey and curd mixture and of quality of the food product (e.g., cheese curds) to be produced with the curd. In some embodiments, for example, the whey and curd mixture at the input device 76 may contain 80% of whey and 20% of curd (or any other suitable ratio) and, due to the draining of whey, there may be, at the output portion 88 of the conveyor mechanism, 20% of whey and 80% of curd (or any other suitable ratio) in the whey and curd mixture. In some embodiments, the whey and curd mixture arriving at the input device 78 may be at a temperature comprised between 38° C. and 42° C. (or between any other suitable temperature limits). In some embodiments, the temperature at the output portion 88 may be at between 36° C. and 38° C. (or between any other suitable temperature limits). That is, in some embodiments, the housing 75 of the conveyor unit 74 may be configured to limit the temperature variation of the whey and curd mixture to about 2° C. to 6° C. In some embodiments, the temperature of the whey and curd mixture present in the conveyor unit 74 may be maintained within a temperature range that favors the fusion and aggregation of protein in the whey and curd mixture. In some embodiments, in addition to reducing heat loss and temperature decrease in the whey and curd mixture, the housing 75 (cover portion 90) may reduce a decrease in humidity of the whey and curd mixture.

As the whey and curd mixture 89 on the conveyor mechanism 77 reaches pass the output portion 88, the whey and curd mixture 89 may fall into the container 92. At this stage, the pH of the whey and curd mixture 89 may be between, FOR EXAMPLE, 5.8 and 6.3. The pH value at this stage may be selected in accordance with the desired cheese product and will affect the texture and the rheology of the cheese curds produced. The pH of the whey and curd mixture 89 as it traverses the conveyor unit 74 may vary by, for example, ±0.05 of a target value situated in the 5.8 to 6.3 pH range. The inventors have found that the housing 75 (cover 90) of the conveyor unit 74 allows to reduce temperature variations of the whey and curd mixture 89 conveying in the conveyor unit 74 and that in turn, reduces variations in the pH value of the whey and curd mixture. That is, the housing 75 allows the temperature of the conveyed whey and curd mixture to vary less than if there were no housing 75 (cover 90). As will be understood by the skilled worker, the ability to control the pH of the whey and curd mixture 89 allows some control over demineralisation of the whey and curd mixture 89 as it arrives at the container 92. The container 92 may have any suitable height and diameter and may be selected according to a cheesemaker's desired production. As an example, the container may have a height comprised between 2 and 5 meters and may have a diameter of 1.5 meter. Containers with heights outside the 2 to 5 meter range or diameters different than 1.5 meter are to be considered within the scope of the present disclosure. The apparatus 70 may be configured to produce between 500 and 3000 kg of fused curd daily (between 500 and 3000 kg of cheese curds).

The container 92 may have a cylindrical portion 94 and an extruder portion 96 coupled to the cylindrical portion 94. The extruder portion may be coupled to an output portion 98. The cylindrical portion 94 and the extruder portion 98 may be coupled to the recovery conduit 82, through a connecting conduit 100, to recover whey present in the cylindrical portion 94 or the extruder portion 96.

The cylindrical portion 94 or the extruder portion 96 or both the cylindrical portion 94 and the extruder portion 96 may have an interior wall 104, spaced apart from the exterior wall 93, and configured to drain whey from the whey and curd mixture received in the container 92 as the whey is expressed from the curd stack that is forming in the container 92. The interior wall may include any suitable type of filter material such as, for example, a stainless steel mesh. The curd passing through the extruder portion 96 may increase the mass density of the curd.

The cylindrical portion 94 and/or the extruder portion 96 may include or be thermally coupled to a heating device 91 configured to maintain the cylindrical portion 96 and/or the extruder portion 96 at a target temperature. Any suitable type of heating device may be used. For example, the cylindrical portion 94 and/or the extruder portion 96 may be thermally coupled to a heat exchanger or include a thermal jacket configured to have a warm fluid (e.g., warm water) circulating therein. A controller 113 may be connected to a thermometer device 115 coupled to the container 92 and also be coupled to the source (not shown) of the fluid to control a temperature of the fluid. The controller may be configured control to maintain the temperature of the container at a target temperature. The controller may also be coupled to a pump (not shown) configured to pump or circulate the warm fluid through the jacket. In some embodiments, the temperature of the container 92 may be controlled within about ±0.5° C.

As the whey and curd mixture 89 falls into the container 92, a curd stack 106 is formed in the container 92. As the curd stack 106 grows in height, pressure along the curd stack and at the bottom of the curd stack increases, which causes air-filled or whey-filled interstices in the curd stack 106 to collapse and to expel, out the curd stack, the whey or air that was in the interstices. That is, as the pressure increases with the addition of whey and curd mixture in the container 92, the curd stack 106 fuses into a continuous curd stack (i.e., a curd stack mostly free of interstices).

The desired pressure at the bottom of the curd stack 106 or at a bottom portion of the curd stack 106 may be comprised between, for example, about 0.2 kg/cm$^2$ and about 0.42 kg/cm$^2$ or more (about 2.85 psi to about 6 psi or more). For example, the desired pressure may be 0.45 kg/cm$^2$, which is produced by a curd stack having a height of about 5 meters. However, any other suitable pressure at the bottom of the curd stack can be used without departing from the scope of the present disclosure. Curd stack taller than 5 m are within the scope of the present disclosure. As will be understood by the skilled worker, the curd stack 106 may have associated thereto a pressure per unit length parameter defining the pressure at the bottom of the curd stack 106 as a function of the height of the curd stack 106. The pressure per unit length parameter may be obtained in accordance with a known curd density and with the geometry of the curd stack.

The extruder portion 58 may be configured to funnel or extrude the curd stack 106 toward the output portion 98. The funnelling of the curd stack 106 may cause lateral compression of the curd stack 106 as well as longitudinal stretching of the curd stack 106. The lateral compression (compression in a plane that is perpendicular to the length of the curd stack) and longitudinal stretching (stretching along the axis defined by length of the curd stack) helps create a fibrous texture in the curd stack 106, which contributes to the continuousness of the curd stack 106.

In some embodiments, the cylindrical portion 94 may have a horizontal circular cross section and the extruder portion 96 may have a horizontal square or rectangular cross section Any other suitably shaped cylinder and extruder portion are to be considered within the scope of the present disclosure. In some embodiments, the cross-section of the cylindrical portion 94 and the output cross-section of the extruder portion may be selected to cause a reduction in surface area of about 50% or any other suitable reduction percentage. That is, the surface area the horizontal cross-section of a block of curd output from the extruder portion 96 or from the output portion 98 may be half of the horizontal cross-section of the curd stack in the cylinder portion 94. Any other suitable change in surface area is to be considered within the scope of the present disclosure. In some embodiments, the density of the curd may increase due to the curd passing through the extruder portion 96.

Having square or rectangular cross-section blocks of curd (114) allows for a more uniform milling of the blocks of curd to produce (e.g., a cutting process) uniformly sizes pieces of curd (i.e., pieces or curd having a substantially same weight, volume and surface area), which allows even seasoning (e.g., salting) of the pieces of curd and allows for automated packaging of the pieces of curds in packages having a substantially same weight.

The output portion 98 may include guillotine valves 102 configured to cut a block of the curd stack 106 and to release the block from the output portion 98. The guillotine valves 102 may be vertically spaced apart by any suitable distance. The vertical spacing of the guillotine valves determines the height of blocks of curd obtained from the curd stack 106.

The apparatus 70 may comprise a cover 108 configured to close off or seal a top opening 110 defined by the container 92. The apparatus 70 may also comprise a (food grade) gas pressure system 112 coupled to the cover 110 and/or the container 92 through a gas line 95. In some embodiments, when producing a batch of cheese curds of a size that does not require a full-height curd stack 106, and where the maximum height of the curd stack 106 for that batch is insufficient to produce, at the bottom portion of the curd stack, the pressure required to obtain or produce the desired fused curd stack, then the container may be sealed with the cover 108 and the gas pressure system 112 may be activated to provide an overpressure in the container to compensate for the shortness of the curd stack 106. The overpressure on the curd stack 106 may decrease the spacing between the casein micelles present in the curd stack 106 and contribute to the aggregation and fusion of the micelles. This contributes to regulating the humidity level of the cheese products obtained from the curd stack 106.

The overpressure may range from a few pounds per square inch (psi) over atmospheric pressure up to 8.8 psi or more above atmospheric pressure. The range of overpressure contemplated in embodiments of the present disclosure may be qualified as low overpressure range. Non-limiting examples of gases that can be provided to the inside of the container include food grade carbon dioxide, air and nitrogen. The overpressure produced by the gas pressure system 112 subjects the curd stack 106 to the overpressure. The container may include a pressure measuring device 111 configured to measure the overpressure in the container. The pressure measuring device 111 may be coupled to the cover 108, the cylindrical portion 94 or the extrusion portion 96. The inventors have discovered that when the curd stack 106 is not sufficiently tall to produce a target pressure at the bottom of the curd stack 106, an overpressure of gas may be introduced in the container to compensate for the insufficient height of the curd stack and to produce cheese curds of the same quality as those produce from a taller curd stack that generates the target pressure at the bottom of the curd stack. The overpressure of gas on the curd stack cause the casein micelle matrix to contract and, consequently, express whey that may be present in the casein micelle matrix.

When there is an overpressure in the container 92, it is important for the cover 108 to be secured to the container 92 during operation such as to seal the top opening 110. Any suitable mechanisms for securing the cover 108 to the container 92 to seal the top opening 110 are considered within the scope of the present disclosure. In some embodiments, a seal (not shown) may be installed such that the seal is between the cover 108 and the top of the container 92 when the cover 109 is closed.

The overpressure applied to the curd stack 106 subjects the curd stack to an additional pressure, which assists in the syneresis process. The syneresis process contributes to whey being expressed from the curd stack 106 as the acidification of the curd takes place.

The system 70 may also include a recovery pump 124 configured to pump recovered whey or cheese curd from the recovery conduits 82, 83 and 100 into a recovery vessel (not show) or a drain (not shown).

One or more shut-off valve (not shown) may be installed to prevent the overpressure in the container 92 to be felt at the recovery pump 124 or at the conveyor unit 74. For example, shut-off valves may be installed immediately before the recovery pump 124 and along the recovery conduit 82, below the connecting conduit 83.

The system 70 may include one or more acidity measuring device 107 (e.g., a pH meter) installed in the container 92 and configured to measure the acidity of the curd stack 106. The system 70 may include a controller 113 that may be coupled to the acidity measuring device 107, to the pressure measuring device 111, to the gas pressure system 112, to shut-off valves that may be present along the whey recovery conduits and to the conveyor unit 74. The controller 113 may be configured to control the gas pressure system according to a gas pressure signal received from the pressure measuring device. The controller may also be configured to control the butterfly valves 102 in accordance with a pH signal received from the acidity measuring device 107. The system may also include a curd stack pressure sensor 131 (or a force sensor) also coupled to the controller 113 and configured to measure a pressure or a force applied by the curd stack 106 on the topmost butterfly valve 102.

In operation, the controller 113 may continuously or periodically obtain signals from the acidity measuring device 107, the pressure monitoring device 111, and the pressure sensor 131 and the controller may control the gas pressure systems 112, the guillotine valves 102 and the conveyor unit 74. For example, if the controller 112 receives a signal that indicates the pH of the curd stack 106 has not yet reached a target value, the controller 112 may keep the butterfly valves 102 closed for longer than a predetermined period to allow the pH value of the curd stack 106 to decrease and attain the target value. In another scenario, if the controller 112 receives a signal from the pressure sensor 131 (or the force sensor) indicating the pressure is below a target value and, if the controller 113 obtains a signal the conveyor unit 74 is not in operation and that no additional whey and curd mixture is being added to the container 92, then the controller 113 may cause the cover 108 to be closed and the gas pressure system 112 to be activated to provide a gas overpressure in the container.

FIG. 6 shows a series of curd blocks 114 obtained from the container 92. The curd blocks 114 exit the output portion 98 onto a first conveying device 116, which, in some embodiments, may convey the curd blocks 114 towards a second conveying device 118, which is vertically spaced apart from the first conveying device 116. The vertical spacing between the first conveyor device 116 and the second conveyor device 118 is selected to be shorter than a height of the curd blocks 114 to cause the curd blocks 114 to be vertically flattened and horizontally stretched as they convey between the first conveyor device 116 and the second conveyor device 118. The first conveyor device 116 and the second conveyor device 118 therefore act as a rolling mill for the curd blocks 114. Any other suitable device configured to stretch and flattened the curd blocks are within the scope of the present disclosure. For example, a press may be used to flatten and stretch the curd blocks. The rolling mill and the press or any other device or apparatus configured to flatten and stretch blocks of curds may be referred to as a stretching device.

The flattening and stretching of the curd blocks 114 as they convey between the first conveyor device 116 and the second conveyor device 118 increases an alignment of the fibrous structure of the curd of curd blocks 114. This may result in increase shape and size uniformity of the cheese curds obtained when cutting the blocks of curd.

After conveying between the first conveyor device 116 and the second conveyor device 118, the curd blocks 114 are provided to a curd cutter (curd mill, cheese cutter, cheese mill) 120, which is configured to cut the curd blocks 114 into pieces of curds, which may be referred to as cheese curds. The cheese curds may exit the curd mill 120 onto a cheese curd conveyor 122, which may convey the cheese curds toward a salting process and then to a packaging process. Alternatively, the cheese curds may be conveyed to any other suitable processing step.

Figure 7:
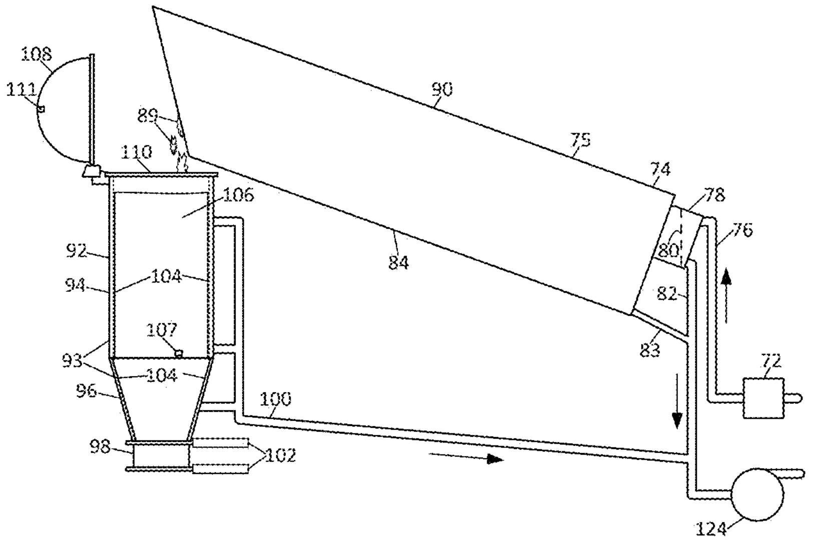
FIG. 7 shows a cutaway view of the embodiment of the apparatus of FIG. 6.

FIG. 7 shows the apparatus 70 but with the housing 75 covering the conveyor mechanism 77.

Figure 8:
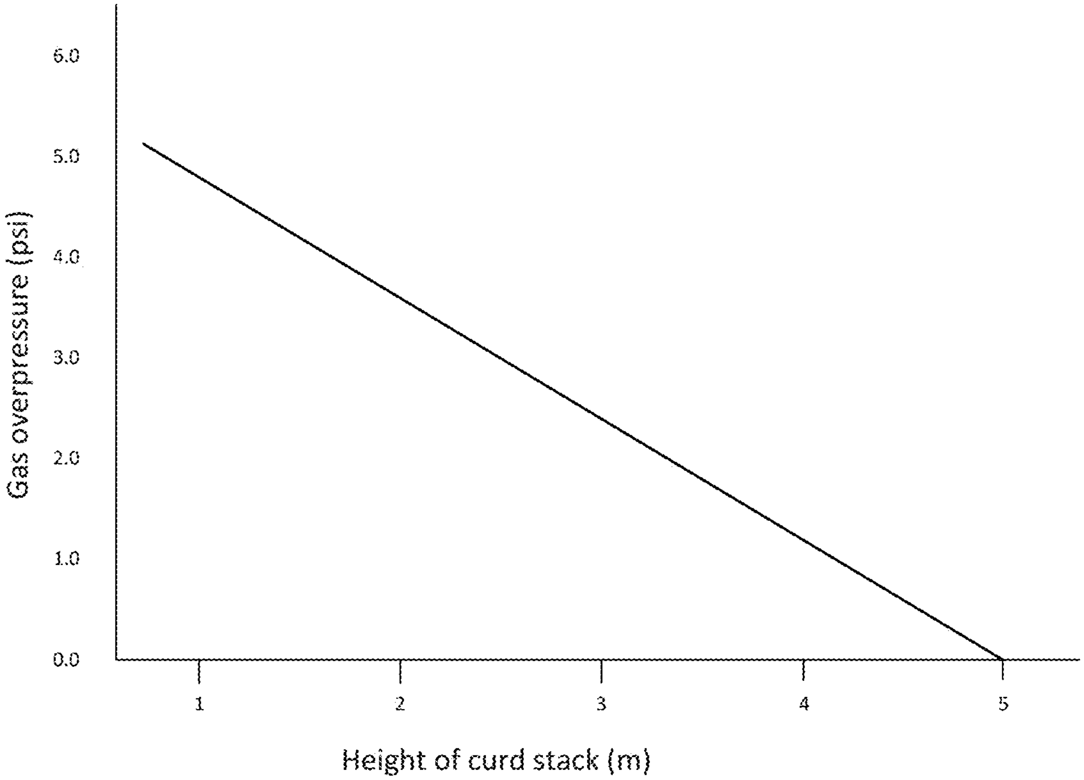
FIG. 8 shows a plot of the overpressure required to be applied in the container 92 as a function of the height of the curd stack in accordance with an embodiment of the present disclosure.

FIG. 8 shows a plot of the overpressure required to be applied in the container 92 as a function of the height of the curd stack 106 for a curd stack that has a target curd stack pressure of 0.42 $kg/cm^2$.

Figure 9:
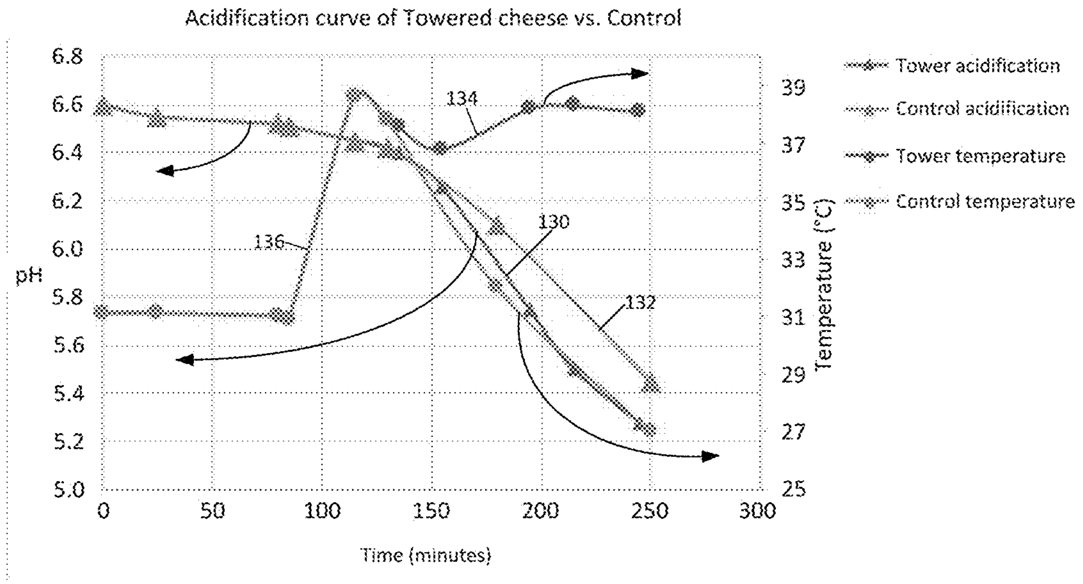
FIG. 9 shows plots of acidification (pH) and temperature for a cheese curd stack prepared according to an embodiment of the present disclosure and for a cheese curd stack prepared according toa traditional process.

FIG. 9 shows a plot 130 of acidification of a cheese curd stack (tower acidification) as a function of time for the cheese curd prepared using a cheese tower (curd container 92/apparatus 70) as shown in FIGS. 6 and 7 and a plot 132 of acidification (control acidification) for a cheese curd stack prepared according to a traditional manual process. FIG. 9 also shows a plot 134 of the temperature of the cheese curd stack as a function of time for the cheese curd prepared in the cheese tower (tower temperature) and a plot 136 of the temperature of the cheese curd stack prepared according to the traditional manual process. The temperatures of the cheese curd (plots 134 and 136) are the same between 0 minutes and about 115 minutes, which is the period during which the curd is cooked in a cheese vat. The acidity of the cheese curd is the same between 0 and about 115 minutes. However, the plot 130 and the plot 132 show that maintaining the temperature of the cheese curd stack at about 38° C. between about 115 minutes and about 250 minutes results in a faster decrease in the pH value of the cheese curd stack prepared according to an embodiment of the present disclosure than allowing the cheese curd stack to cool during a similar time span when using a traditional method.

Figure 10:
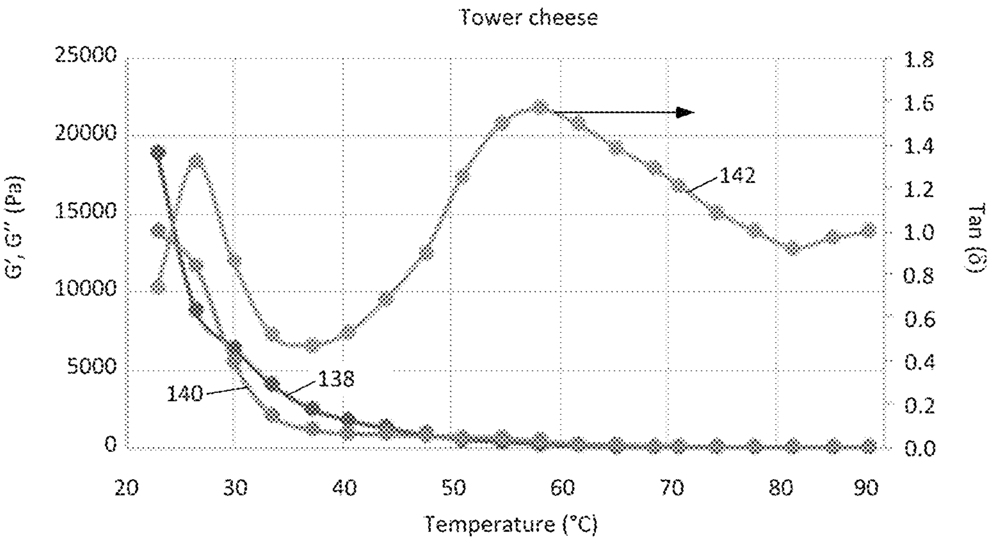
FIG. 10 shows plots of the storage modulus (G'), the loss modulus (G"), and the ratio of G"/G', as a function of temperature, for a sample of the curd stack prepared with an apparatus according with the present disclosure.

FIG. 10 shows a plot 138 of the storage modulus (G') and a plot 140 of the loss modulus (G"), as a function of temperature, for a sample of the curd stack prepared with an apparatus according with the present disclosure. FIG. 10 also shows a plot 142 of G"/G'=tan δ.

As the temperature increases from 20° C. to 50° C., G' and G" decrease due to fat liquefaction, but G' is larger than G", indicating the mechanical resistance of the protein network in the curd stack sample. The slope of G' (plot 138) changes between 40° C. and 50° C., which suggests a change in the mechanical resistance of the protein network (cheese network) in relation to the thermal stability of the proteins. The change is observed in tan δ, which starts to increase rapidly. When the temperature reaches a value where G' equals to G" (tan δ=1), the melting point of curd stack sample occurs. This means the curd stack sample is undergoing a phase transition, where cheese changes from solid to semi-solid or liquid phase as a function of temperature. According to the plot 142, the melting point associated to the curd stack sample is between about 48° C. and 55° C. As the temperature increases beyond the melting point, the protein structure begins to collapse and the structural arrangement of the casein and the whey protein follows a complex process. The value of tan δ reaches a maximum at about 58° C., which is associated with colloidal calcium phosphate (CCP).

Figure 11:
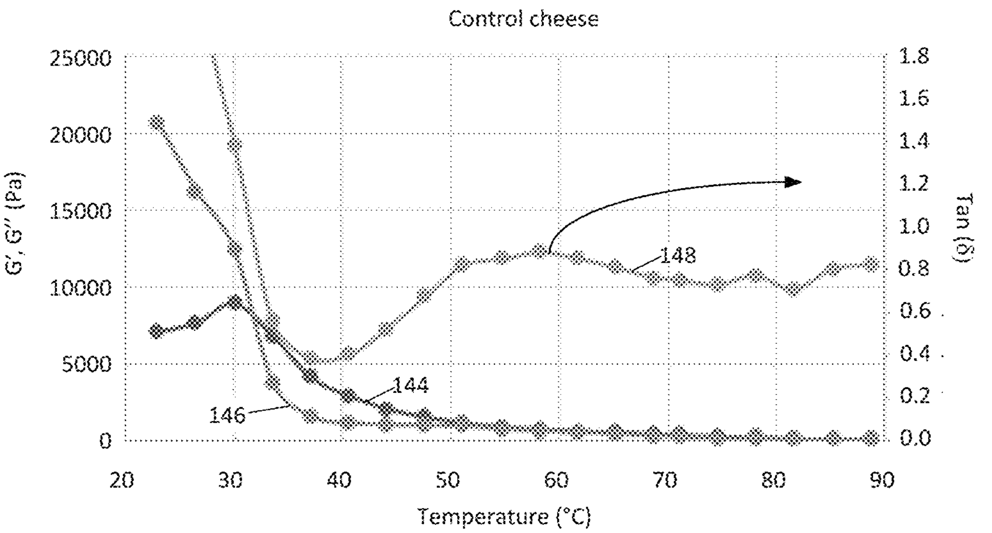
FIG. 11 shows plots of the storage modulus (G'), the loss modulus (G"), and the ratio of G"/G', as a function of temperature, for a sample of the curd stack prepared according to a traditional process.

FIG. 11 shows a plot 144 of the storage modulus (G') and a plot 146 of the loss modulus (G"), as a function of temperature, for a sample of a curd stack prepared according to a traditional (manual) process, as a function of temperature. FIG. 10 also shows a plot 148 of G"/G'=tan δ. The tower cheese (FIG. 9) has a melting point between 48 and 55° C., however, tan δ of the control cheese (FIG. 10) is below 1 around that temperature range and remains below 1 even at higher temperature. The difference between tower cheese and control cheese at this temperature corelates the demineralization and acidification.

This indicates the tower cheese has the meltability function at same age as control cheese which does not have this property.

Figure 12:
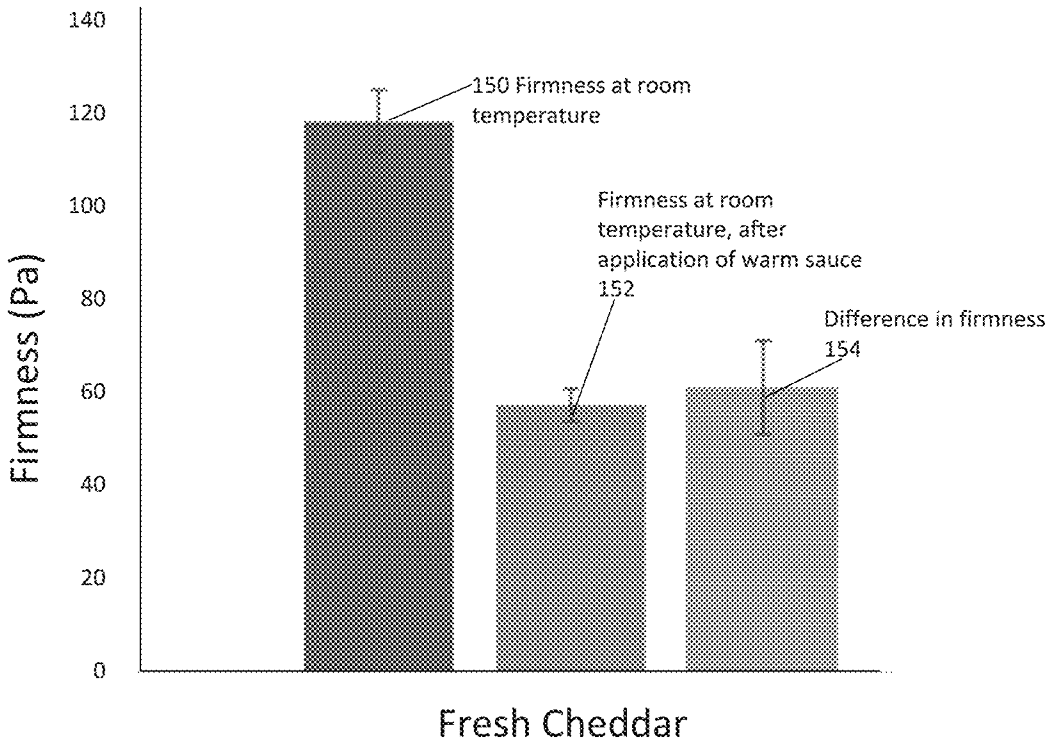
FIG. 12 shows a bar graph of the firmness a fresh cheddar cheese curd at room temperature, the firmness of the fresh cheddar cheese curd at room temperature after an application of a warm sauce to the fresh cheddar cheese curd and the firmness difference.

FIG. 12 a bar graph with the firmness 150 for fresh cheddar cheese curd at room temperature, the firmness 152 of the fresh cheddar cheese curd at room temperature after an application of a warm sauce to the fresh cheddar cheese curd and the difference between the firmness 152 and the firmness 150. The application of the warm sauce may be similar to the application of warm gravy on cheese curds during the preparation of a poutine dish. Mouth feel is affected.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus for fusing curd, comprising:

a container configured to receive curd to form a curd stack in the container, the curd stack having associated thereto a pressure parameter specifying a pressure required at a bottom of the curd stack to produce a curd block from a bottom portion of the curd stack; and a gas pressure system configured to apply a gas overpressure in the container, the gas pressure system being configured to apply the gas overpressure when a pressure value at the bottom of the curd stack is below the pressure parameter, the gas overpressure having a gas overpressure value equal to or greater than a difference between the pressure required at the bottom of the curd stack and the pressure value at the bottom of the curd stack.

2. The apparatus of the claim 1, wherein the gas pressure system comprises:

a cover configured to seal the container; and a gas source coupled to the container and configured to provide gas in the container to apply the overpressure.

3. The apparatus of claim 1, further comprising:

a controller configured to obtain an indication that the pressure applied by the curd stack at the bottom of the curd stack is below the pressure parameter, the controller further configured to obtain the value of the gas overpressure to apply in the container.

4. The apparatus of claim 3, further comprising a pressure sensor configured to measure the pressure at the bottom of the curd stack and to provide a signal to the controller to indicate that the pressure applied by the curd stack at the bottom of the curd stack is below the pressure parameter.

5. The apparatus of claim 1, further comprising a gas pressure sensing device configured to measure a gas pressure inside the container.

6. The apparatus of claim 3, wherein the controller is configured to determine the pressure at the bottom of the curd stack in accordance with a height of the curd stack and with a predetermined pressure per unit length parameter of the curd stack.

7. The apparatus of claim 1, further comprising:

a conveyor unit including:

a conveyor mechanism having a receiving portion and an emptying portion, the conveyor mechanism configured to convey a whey and curd mixture from the receiving portion toward the emptying portion, the emptying portion configured to provide the whey and curd mixture to the container;

an input unit configured to receive the whey and curd mixture and to provide the whey and curd mixture to the receiving portion of the conveyor mechanism; and a cover portion covering the conveyor mechanism, the cover portion configured to impede a loss of thermal energy from the whey and curd mixture to an outside of the conveyor unit to limit a drop in a temperature of the whey and curd mixture as the whey and curd mixture is conveyed from the receiving portion (86) to the emptying portion.

8. The apparatus of claim 1, wherein the container has an output portion configured to cut a block of curd from the curd stack, the apparatus further comprising:

a stretching device configured to receive the block of curd and to reduce a thickness and increase a length of the block of curd; and a curd cutter configured to receive the block of curd from the stretching device and to cut the block of curd into cheese curds.

9. The apparatus of claim 8, wherein the stretching device comprises vertically spaced apart conveyors between which the block of curd is to be provided.

10. The apparatus of claim 1, further comprising a temperature control system configured to maintain a temperature of the container within a predetermined temperature range.

11. The apparatus of claim 10, wherein the temperature control system is configured to maintain the temperature within the predetermined temperature range with an accuracy of ±0.5° C.

12. The apparatus of claim 7, further comprising a pump system configured to pump the whey and curd mixture from a cheese cooking vat to the conveyor unit.

13. The apparatus of claim 12, wherein the pump system comprises a positive displacement pump.

14. The apparatus of claim 7, wherein the conveyor mechanism is configured to drain whey from the whey and curd mixture as the whey and curd mixture is conveyed from the receiving portion to the emptying portion.

15. The apparatus of claim 14, wherein the conveyor mechanism includes a perforated conveyor belt defining a plurality of draining apertures configured to allow whey from the whey and curd mixture to drip therefrom.

16. The apparatus of claim 15, wherein the conveyor mechanism includes a gutter configured to receive whey dripping through the plurality of draining apertures and to output the whey to a whey recovery container.

* * * * *